Patented Feb. 13, 1945

2,369,158

UNITED STATES PATENT OFFICE 2,369,158

SYNTHESIS OF VITAMIN A

Nicholas A. Milas, Belmont, Mass., assignor to Research Corporation, New York, N. Y., a corporation of New York No Drawing. Application October 1, 1941, Serial No. 413,233

7 Claims. (Cl. 260—464)

This invention relates to a method for the synthesis of vitamin A and to certain intermediate products thereof.

The process may be regarded as starting with the compound having the formula

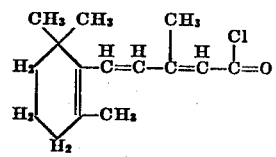

Compound I although, as will be apparent, the synthesis may be carried on from any of the intermediate products regardless of how they may have been prepared.

In my complete process starting with Compound I, the first step is to condense Compound I with malonic ester in the presence of an alcoholate such as magnesium or lithium alcoholate to form Compound II as follows

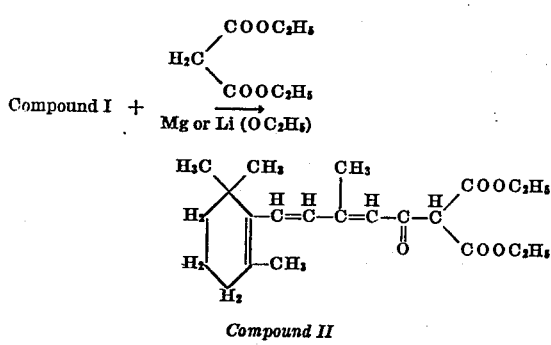

Compound II

In the second step Compound II is condensed with ethyl tetrolate (Compound III) in the presence of sodium alcoholate to give Compound IV.

$$CH_3C\equiv C-COOC_2H_5$$
(Compound III)

Compound II+ $\xrightarrow{NaOC_2H_5}$

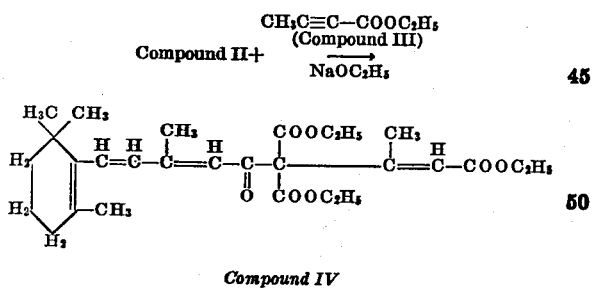

Compound IV

Compound IV is then saponified in the presence of alcoholic potash to give the tri-carboxylic acid Compound V.

Compound IV+ $\xrightarrow{\text{alcoholic potash}}$

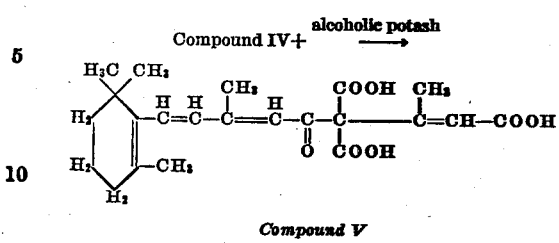

Compound V

When Compound V is heated in an inert atmosphere in the presence or absence of an organic base such as pyridine or powdered metallic copper it is decarboxylated to Compound VI.

Compound V + $\xrightarrow[\text{heat}]{\text{organic base or Cu}}$

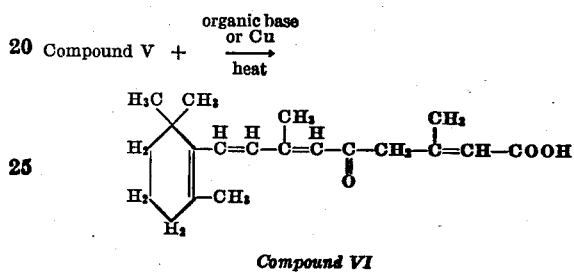

Compound VI

When Compound VI is esterified and subsequently reduced with aluminum iso-propylate Compound VIII results.

Compound VI + esterification $\longrightarrow$

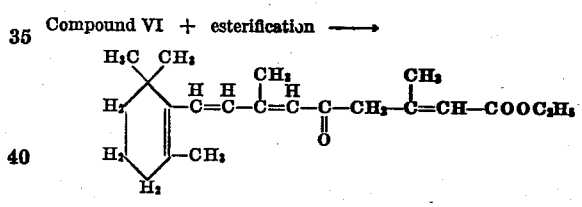

Compound VII

Compound VII + $\xrightarrow{\text{Al (isopropylate)}_3}$

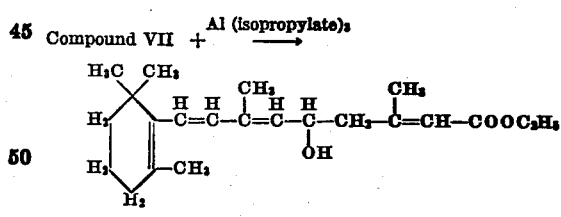

Compound VIII

When Compound VIII is treated with thionyl chloride in the presence of pyridine or with p-toluene sulphonic acid in the presence of benzene or toluene or with anhydrous oxalic acid it becomes dehydrated to Compound IX.

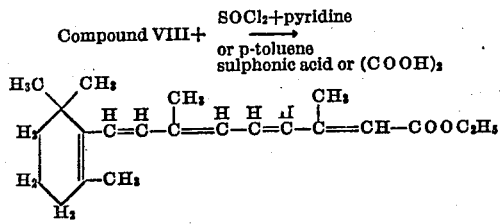

*Compound IX*

Compound IX may be more simply prepared by reducing Compound IV with aluminum iso-propylate to form Compound IV-A.

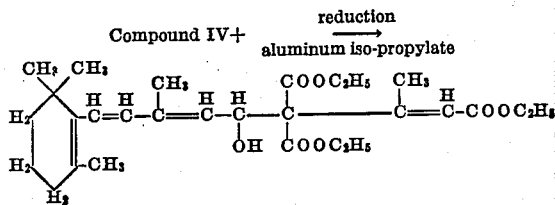

*Compound IV-A*

Then Compound IV-A is saponified with alcoholic potash and the hydroxy tri-carboxylic acid formed is decarboxylated in the presence of pyridine. This latter operation simultaneously dehydrates the hydroxy acid to form the acid Compound IV-B.

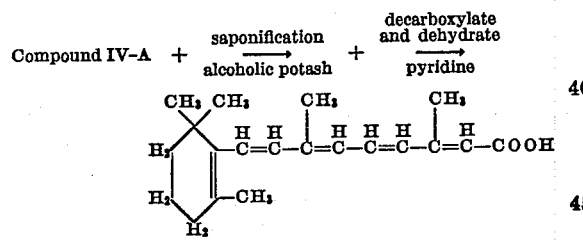

Compound IV-B can easily be converted to Compound IX by the methods of esterification described in more detail hereinafter.

Compound IX may be converted to vitamin A by treating it with excess hydrogen calcium bromide, thereby producing the desired alcohol or vitamin A.

Vitamin A may also be produced from Compound IV-B by making first the corresponding acid chloride of this compound and then reacting the acid chloride with excess hydrogen magnesium bromide or hydrogen calcium bromide or iodide.

A shorter procedure for the preparation of Compound IV consists in treating Compound I with Compound X in the presence of magnesium or lithium alcoholates.

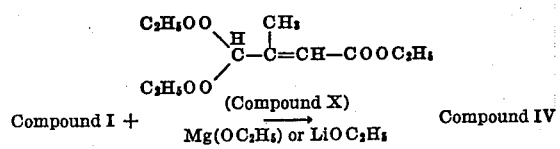

Instead of using tetrolic ester (Compound III) tetrolic nitrile (Compound XI) may advantageously be used in the condensation with Compound II in the presence of sodium ethylate.

This reaction will result in the formation of Compound XII.

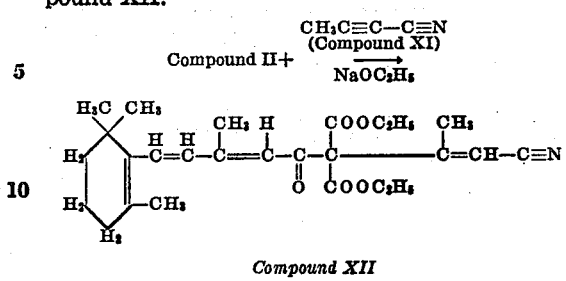

*Compound XII*

Compound XII is then saponified with alcoholic potash to give Compound XIII.

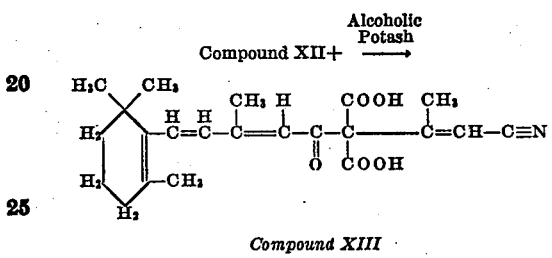

*Compound XIII*

Compound XIII is then decarboxylated as in the case of Compound V to give Compound XIV.

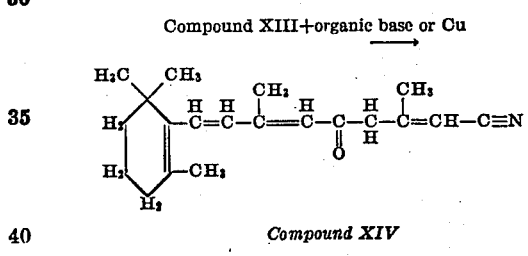

*Compound XIV*

Compound XIV is then reduced with aluminum iso-propylate as in the case of Compound VII to give Compound XV.

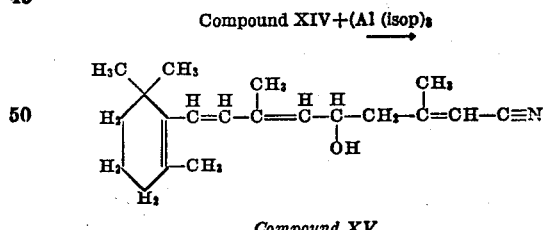

*Compound XV* which is dehydrated as in the case of Compound VIII to Compound XVI.

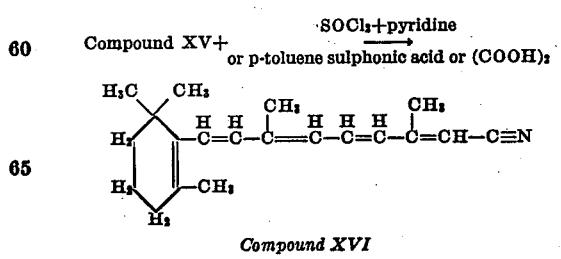

*Compound XVI*

When Compound XVI is treated with stannous chloride in the presence of an inert gas such as nitrogen (Stephen's method), it gives Compound XVII which on further reduction with aluminum iso-propylate gives vitamin A. Compound XVI may also be reduced to the imine by hydrogen calcium iodide and the imine hydrolyzed to give Compound XVII.

Compound XVI + SnCl₂ ⟶

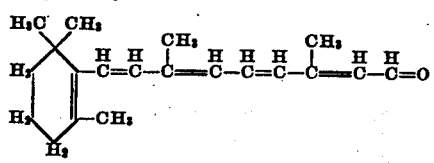

*Compound XVII*

Compound XVII + $\xrightarrow{\text{Al (isop)}_3}$ Vitamin A

An alternative procedure for the synthesis of vitamin A is as follows:

When Compound II is treated with beta acetoxy ethyl methyl ketone (Compound XVIII) in the presence of sodium ethylate, Compound XIX results.

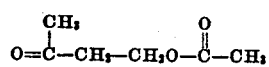

Compound II + (Compound XVIII) $\xrightarrow{\text{NaOC}_2\text{H}_5}$

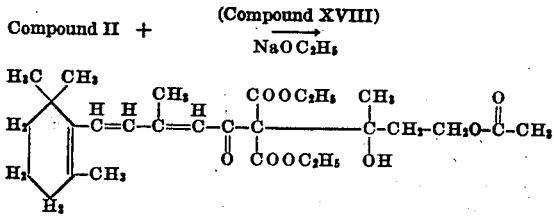

*Compound XIX*

Compound XIX is then dehydrated in the presence of para-toluene sulphonic acid using benzene and toluene to remove the water formed, or by heating in the presence of small amounts of iodine, or other dehydrating agents, to give Compound XX.

Compound XIX+ $\xrightarrow[\text{or I}_2]{\text{p-toluene sulphonic acid}}$

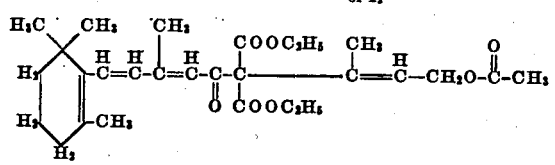

*Compound XX*

When Compound XX is hydrolyzed with alcoholic potash and subsequently decarboxylated, Compound XXI results.

Compound XX+ $\xrightarrow[\text{decarboxylated}]{\text{alcoholic potash subsequently}}$

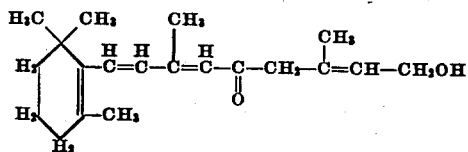

*Compound XXI*

Compound XXI is then reduced with aluminum iso-propylate and dehydrated by heating in the presence of para-toluene sulphonic acid and benzene or toluene or in the presence of anhydrous oxalic acid to give vitamin A.

Compound XXI+ $\xrightarrow[\substack{\text{subsequently dehydrated with} \\ \text{p-toluene sulphonic acid or} \\ \text{(COOH)}_2}]{\text{Al (isop)}_3}$ Vitamin A An alternative procedure for the synthesis of vitamin A consists in the condensation of Compound XXIII, having the formula $$XCH_2-\overset{\overset{\displaystyle CH_3}{|}}{C}=CH-CH_2-O-\overset{\overset{\displaystyle O}{\|}}{C}-CH_3$$

in which X represents a halogen atom with Compound I in the presence of metals such as magnesium, calcium, zinc, chromium, beryllium, aluminum and lithium to form Compound XXIV.

Compound I+ $\xrightarrow[\text{Mg, Zn, Al, Li, etc.}]{\text{(Compound XXIII)}}$

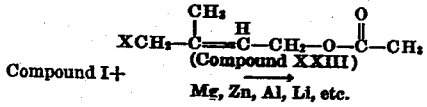

*Compound XXIV*

Compound XXIV is then reduced with aluminum isopropylate to the resulting carbinol compound XXV which is dehydrated as in the case of Compound VIII to the vitamin A acetate.

Compound XXIV+ $\xrightarrow{\text{reduction}}$ Compound XXV

Compound XXV+ $\xrightarrow{\text{dehydration}}$ Vitamin A acetate

A still simpler procedure for the synthesis of vitamin A acetate consists in the condensation of Compound XXIII with compound XXVI in the presence of one of the metals Mg, Zn, Al, Li, Ca, Cr or Be to form the carbinol Compound XXV in one step which is dehydrated as in the case of Compound VIII to the vitamin A acetate.

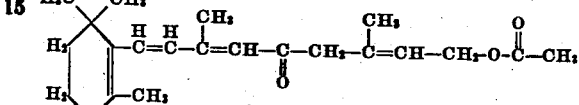

+ Compound XXIII $\xrightarrow{\text{Mg, Zn, Al, Li, etc.}}$

*Compound XXVI*

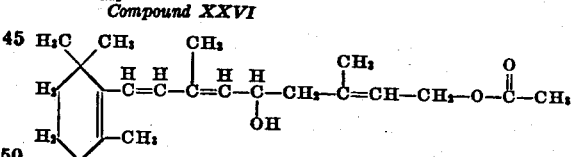

*Compound XXV*

Compound XXV+ $\xrightarrow{\text{dehydrate}}$ Vitamin A acetate

Another procedure for the preparation of vitamin A acetate consists in the condensation of Compound XXII with Compound XXVI in the presence of sodium, magnesium or lithium alcoholates to give Compound XXVII.

Compound XXVI+ $\xrightarrow[\text{Mg(OR)}_2\text{, NaOR, or LiOr}]{\text{Compound XXII}}$

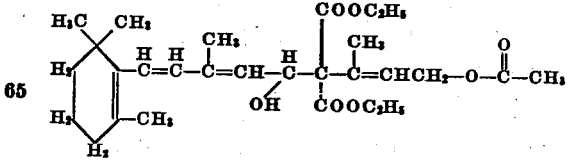

*Compound XXVII*

Compound XXVII is saponified with alcoholic potash and then slowly decarboxylated and dehydrated in the presence of pyridine to give vitamin A.

The following are detailed descriptions of the steps briefly outlined above.

Condensation of the Acid Chloride, Compound I, with Diethyl Malonate

Magnesium alcoholate is made by refluxing a mixture of 100 cc of absolute ethyl alcohol, 2 cc. of carbon tetrachloride and 17.5 g. of clean magnesium turnings for 15 hours. The magnesium alcoholate is then cooled to 0° and 114 g. of diethyl malonate is slowly added with care, keeping the temperature as low as possible. After the vigorous reaction is over, 300 cc. of anhydrous ether is added and the mixture refluxed until most of the magnesium disappears. The mixture is then cooled to 0° and an ethereal solution of 90 g. of the acid chloride, Compound I, added and the mixture gently refluxed on the water bath for several hours. Acetic acid (25%) is then cautiously added until the solution is acid to litmus and all precipitated solid dissolved. The non-aqueous layer is separated and the aqueous layer extracted once again and the combined ether layers washed with sodium carbonate solution (10%), then with sodium chloride solution (10%) and dried over magnesium sulfate. When the ether was removed and the excess malonic ester distilled under reduced pressure, a dark brown liquid, Compound II, remained.

The ester, Compound II, gives a strong greenish brown coloration with ferric chloride solution and the absorption spectrum in the region of about 3290 Å.

Condensation of Compound II with Ethyl Tetrolate—Compound III

Into 200 cc. of absolute alcohol dissolve 4 g. of metallic sodium, then add slowly to the mixture 50 g. of Compound II. When all of the latter has dissolved, add slowly, with shaking and cooling to prevent rapid reaction, 15.6 g. of ethyl tetrolate (Compound III). Allow the mixture to stand at room temperature overnight, then add to it 50 cc. of ice-cold sulfuric acid solution containing 5 cc. of concentrated sulfuric acid. Separate the oil that forms and extract the aqueous mixture twice with ethyl ether, combine the extracts with the oil, and wash the combined mixture with a 10% solution of sodium chloride and dry it over anhydrous magnesium sulfate. Remove the ether and distill under reduced pressure the excess ethyl tetrolate, leaving Compound IV.

The product, Compound IV, is a brown viscous liquid. It gives no ferric chloride reaction and has an absorption band the maximum of which is 2800 Å.

Saponification of Compound IV to the Tricarboxylic Acid, Compound V

A solution of 5.5 g. of Compound IV in 95% alcohol was mixed with 35 cc. of alcoholic potash containing 3 g. of potassium hydroxide and the mixture allowed to stand at room temperature for one hour, then gently heated on the steam bath for 75 minutes while nitrogen was being passed through the solution. The mixture was then cooled and poured into 2 volumes of water and the resulting mixture extracted three times with ether to remove any unsaponifiable material. The aqueous solution was then acidified with cold 10% orthophosphoric acid solution and the tricarboxylic acid extracted three times with ether; the extracts combined, washed several times with a saturated solution of sodium chloride and dried over magnesium sulfate. After the mixture was filtered and the ether removed under reduced pressure, the brown viscous tricarboxylic acid, Compound V, was subjected to a high vacuum (1 mm.) in an atmosphere of nitrogen for 3 hours at about 45° to remove any volatile materials. Partial decarboxylation occurred at this stage. Further decarboxylation of the product may be accomplished by heating at 1 mm. pressure for a longer time or at a higher temperature, e. g. for 4 hours at 60° C., for 5 hours at 95° C. and for 5 hours at 130° C.

A neutralization equivalent was taken of the product heated at 130° C. and found to be 300 as against 316, the calculated value.

A sample made via the β-methyl-γ-carboethoxy glutaconic ester was decarboxylated in the same manner and gave identical results.

Decarboxylation of Tricarboxylic Acid, Compound V, by Pyridine to Produce Compound VI To 10 g. of tricarboxylic acid (Compound V) was added 8 cc. of anhydrous pyridine and the mixture allowed to stand overnight at room temperature. A solution of 63 cc. of 10% phosphoric acid was then added to the mixture with cooling in ice and the resulting mixture vigorously shaken until the odor of pyridine was no longer perceptible. The mixture was then extracted with ether and the ether extract washed with water and dried as before. The ether was removed under reduced pressure and the residue, Compound VI, subjected to a vacuum of 2 mm. at 60–70° for two hours.

The decarboxylation has also been accomplished by heating gently in the presence of metallic copper powder.

Esterification of Compound VI and Subsequent Reduction of the Ketoester (Compound VII) to the Hydroxyester (Compound VIII)

Esterification of the ketoacid (Compound VI) was effected by four independent methods: (1) by refluxing for 3 hours a mixture of the ketoacid (8.5 g.), absolute ethyl alcohol (8 cc.), anhydrous copper sulfate (4.5 g.) and sulfuric acid (0.2 cc.); (2) by heating at 100° for 24 hours in a sealed tube the silver salt (2.23 g.) of the ketoacid with ethyl iodide (3 g.); (3) by making the acid chloride of the ketoacid (8.5 g.) in dry benzene with phosphorus trichloride (9 g.), cooling to 0° to remove phosphorus acid, and removing benzene and excess phosphorus trichloride under reduced pressure and reacting the residue with a solution of absolute alcohol (10 cc.) in 25 cc. of dry pyridine; (4) by treating the sodium salt of the ketoacid with diethylsulfate. In all cases the product, Compound VII, obtained had the expected analysis. The ketoester, Compound VII, exhibits an absorption band the maximum of which is in the region of 2800 Å.

The reduction of the keto ester (Compound VII) was accomplished by means of aluminum iso-propylate. About 4 g. of the ketoester was refluxed overnight in 60 cc. of anhydrous isopropyl alcohol containing aluminum iso-propylate corresponding to about 0.6 g. of metallic aluminum. Test made from time to time for the production of acetone gave positive results indicating reduction of the ketoester. Finally, the isopropyl alcohol was distilled and the residue taken up in 100 cc. of 20% acetic acid, the mixture extracted with ether and the ethereal solution washed first with a 10% solution of sodium bicarbonate, then with water and finally dried over magnesium sulfate. After filtration, the ether was removed and the residue, Compound VIII, subjected to high vacuum (2 mm.) to remove volatile substituents. The product gave a Zerewitinoff number corresponding closely to one active hydrogen.

DEHYDRATION OF COMPOUND VIII TO PRODUCE COMPOUND IX

The hydroester (Compound VIII) is easily dehydrated by heating it with about one one-hundredth its weight of anhydrous p-toluene sulfonic acid and anhydrous toluene. The latter is distilled under slightly reduced pressure and carries over the water formed into the distillate. The residue is then purified by removing the p-toluene sulfonic acid with a 10% solution of sodium carbonate. The ester (Compound IX) is then extracted with ether and when the ether is removed the residual highly viscous product has the properties and analysis corresponding to the formula of Compound IX.

The dehydration of Compound VIII to produce Compound IX may also be accomplished by making the para-toluene sulfonic ester of this compound by reacting it with para-toluene sulfonyl chloride in pyridine, then subsequently reacting the sulfonic ester with alcoholic potash. This reaction tends to remove para-toluene sulfonic acid rather than hydrolyzing the sulfonyl group thereby producing the conjugated acid which can be esterified to produce Compound IX. The dehydration may also be accomplished by refluxing Compound VIII in the presence of nitrogen with pyridine and thionyl chloride. This again has the ability to chlorinate and dehydrochlorinate the hydroxyl group thereby producing the ester and Compound IX.

The Compound VIII may also be dehydrated by heating it with anhydrous oxalic acid.

REDUCTION OF THE KETOTRIESTER (COMPOUND IV) TO PRODUCE THE HYDROXYTRIESTER COMPOUND IV-A

The ketotriester (Compound IV) (3.6 g.) was reduced with aluminum iso-propylate in the same manner as the ketoester (Compound VII). The product obtained after purification had the properties and analysis corresponding to the formula given above for Compound IV-A.

HYDROLYSIS OF COMPOUND IV-A AND SUBSEQUENT DECARBOXYLATION OF THE TRICARBOXYLIC ACID TO PRODUCE COMPOUND IV-B

The hydroxytriester (Compound IV-A) (3 g.) was hydrolyzed by heating it on the water with alcoholic potash (10%), pouring the mixture into 2 volumes of water, extracting with ether to remove any non-saponifiable material, acidifying the aqueous layer with phosphoric acid (10%) and extracting with ether the liberated tricarboxylic acid. When this acid is subjected to the pyridine decarboxylation as in the case of the decarboxylation of Compound V, the product dehydrated and decarboxylated at the same time to form the monocarboxylic acid (Compound IV-B). Compound IV-B can easily be converted to Compound IX by using the methods of esterification described for Compound VI.

THE REDUCTION OF COMPOUND IX TO PRODUCE VITAMIN A

The reduction of the ester Compound IX is accomplished by reacting it in anhydrous ether solution with 1 mol. of hydrogen magnesium bromide (HMgBr) or hydrogen calcium iodide (HCaI), then hydrolyzing the product with an ice cold solution of ammonium sulfate or ammonium chloride and extracting the mixture with more ether, combining the ethereal extracts, washing the combined solution with a saturated sodium carbonate solution and drying over anhydrous magnesium sulfate. When the ether is removed under reduced pressure the residue exhibits the properties of vitamin A.

CONVERSION OF COMPOUND IV-B TO VITAMIN A

Compound IV-B is first treated in anhydrous benzene at 0° with an equimolecular quantity of phosphorus trichloride, then the mixture is heated at 40° for one-half hour. Cool the mixture to 0° and decant to separate from solid phosphorous acid, then remove the benzene and unreacted phosphorus trichloride at room temperature under reduced pressure. Dissolve the acid chloride in a mixture of anhydrous ether and benzene and treat it with hydrogen calcium iodide (HCaI). After the mixture is allowed to stand at room temperature overnight, it is hydrolyzed with an "iced-cold" solution of ammonium sulfate. The mixture is then extracted with anhydrous ether, the extract dried over magnesium sulfate. When the ether is removed, the residue exhibits vitamin A properties.

SYNTHESIS OF COMPOUND IV BY THE CONDENSATION OF COMPOUND I WITH COMPOUND X

Into 150 cc. of absolute alcohol dissolve 1.5 g. lithium metal and add to it slowly 46.2 g. of beta-methyl-γ-carboethoxy glutaconic ester (Compound X). The alcohol is then removed under reduced pressure and the residue dissolved in a 50—50 mixture of anhydrous ether and benzene, and to this solution was then added 40 g. of Compound I, likewise in anhydrous benzene. The mixture was then allowed to stand at room temperature for 40 hours, then refluxed gently on the steam bath for 2 hours. Dilute acetic acid (10%) was then added until the mixture was definitely acid. The ether-benzene layer was separated, washed with a solution of sodium bicarbonate, then with water and dried over magnesium sulfate. The mixture was then filtered and the ether and benzene removed under reduced pressure whereby a highly viscous residue remained.

The above condensation has been accomplished using the magnesio salt of β-methyl-γ-carboethoxy glutaconic ester with identical results.

CONDENSATION OF TETROLIC NITRILE (COMPOUND XI) WITH COMPOUND II IN THE PRESENCE OF SODIUM ETHYLATE

To 200 cc. of absolute ethyl alcohol is added 4 g. of metallic sodium and when all of the latter is dissolved, 50 g. of Compound II is slowly added, and when all of this has gone into solution the mixture is cooled to about 10°, 9 g. of tetrolic nitrile is slowly added with shaking and cooling in ice to prevent too much rise of temperature. The mixture is finally allowed to stand at room temperature overnight. About 100 cc. of water is then added followed by 50 cc. of dilute sulfuric acid containing 5 cc. of the concentrated acid. The oil that separates out is taken up in ether and the aqueous layer extracted twice with ether and the extracts combined with the first ether solution. The combined ether solution is washed with a 10% sodium chloride solution and dried with anhydrous magnesium sulfate. When the solution is filtered and the ether removed under reduced pressure, the viscous ketoester nitrile is subjected to high vacuum (1 mm.) to remove any volatile material. The final product shows properties which correspond to the formula of Compound XII.

Saponification and Decarboxylation of Compound XII to Produce Compounds XIII and XIV Compound XII is saponified by heating it to 60–80° for 2 hours with alcoholic potash (10%) in an atmosphere of nitrogen. The product is then poured into 2 volumes of water and the solution extracted once with ether to remove any unsaponifiable material. The aqueous layer is acidified with phosphoric acid (10%) and the keto acid nitrile (Compound XIII) extracted with ether. The ether extract is dried and the ether removed under reduced pressure and the residue dissolved in anhydrous pyridine (2 volumes) and allowed to stand overnight at room temperature. It is then poured in water and the resulting mixture extracted with ether. To remove the pyridine the ethereal solution is thoroughly shaken with phosphoric acid (10%). To remove any undecarboxylated acid the ethereal solution is shaken with a 10% solution of sodium carbonate. The ethereal solution is finally dried, the ether removed and the residue subjected to a high vacuum (1 mm.). The final product shows the properties corresponding with the formula of Compound XIV.

Reduction of Compound XIV and Subsequent Dehydration of the Carbinol Formed (Compound XV) to Produce Compound XVI The reduction of Compound XVI is accomplished by means of aluminum iso-propylate in the same manner as the reduction of Compound VII to form Compound VIII.

The hydroxy nitrile (Compound XV) thus formed is easily dehydrated to Compound XVI following the same methods described in the dehydration of Compound VIII to form Compound IX.

Partial Reduction of the Nitrile (Compound XVI) to the Aldehyde (Compound XVII)

The partial reduction of the nitrile (Compound XVI) is accomplished by reacting at room temperature the nitrile in an alcoholic solution with an alcoholic solution of anhydrous stannous chloride saturated with hydrogen chloride. This produces the imino compound which upon addition of water hydrolyzes to the aldehyde (Compound XVII). (This aldehyde is expected to be active biologically.) To produce vitamin A from this aldehyde, Compound XVII, it is treated with hydrogen calcium iodide or with aluminum iso-propylate in anhydrous iso-propyl alcohol. When this is accomplished by refluxing a mixture containing this aldehyde and aluminum iso-propylate and frequent samples of the iso-propyl alcohol together with the acetone are distilled, definite positive tests for acetone with 2,4-dinitro phenyl hydrazine are obtained in the distillates.

The nitrile (Compound XVI) can also be reduced to the imino compound by allowing it to react in an ether-benzene solution with hydrogen calcium iodide. The imino compound is then easily hydrolyzed to the aldehyde when treated with dilute acid.

Condensation of Compound II with Beta-Acetoxy-Ethyl-Methyl Ketone (Compound XVIII) to Produce Compound XIX To 200 cc. of absolute ethyl alcohol is added 4 grams of metallic sodium and when all of the latter is dissolved 50 grams of Compound II is slowly added. When all of the Compound II has gone into solution the mixture is cooled to about +10 degrees and to it is slowly added, with frequent shaking, and cooling in ice to prevent too much rise of temperature, 10 g. of beta-acetoxy ethyl methyl ketone (Compound XVIII). The mixture is then allowed to stand at room temperature over night. About 100 cc. of water is then added, followed by 50 cc. of dilute sulfuric acid, containing 5 cc. of the concentrated acid. The product that separates is dissolved in ether and the aqueous layer extracted twice with ether and the extracts combined with the first ether solution. The combined ether solution is washed with a 10% solution of sodium chloride and dried with anhydrous magnesium sulfate. When this mixture is filtered and the ether removed the residue is found to have the properties corresponding with the formula of Compound XIX.

The Dehydration of Compound XIX to Form Compound XX

When Compound XIX is dissolved in anhydrous toluene and treated with .02 part of anhydrous para-toluene sulfonic acid, the product is dehydrated as the mixture is slowly subjected to slightly reduced pressure so that the toluene is slowly distilled over carrying with it the water formed. This dehydration may also be accomplished by using aluminum phosphate, anhydrous oxalic acid or other mild dehydrating agents in place of para-toluene sulfonic acid.

The Hydrolysis of Compound XX and the Subsequent Decarboxylation of the Keto Dicarboxylic Acid Alcohol Formed to Produce Compound XXI The hydrolysis of Compound XX is accomplished in the manner described for the hydrolysis of esters of this type. Compound XX is dissolved in alcoholic potash (10%) and the mixture heated in an atmosphere of nitrogen for 2 hours at 70 to 80 degrees. The product is then poured in two volumes of water and the resulting mixture extracted a number of times with ether. The combined ether extracts are washed once with a 10% solution of sodium chloride, dried with anhydrous magnesium sulfate, filtered and the ether removed under reduced pressure. The residue, which is the keto dicarboxylic alcohol, is then subjected to decarboxylation by dissolving it in twice the equivalent amount of anhydrous pyridine and allowing the mixture to stand over night. The pyridine solution is then poured in two volumes of water and the resulting mixture extracted a number of times with ether. To remove the pyridine from the ethereal solution, the latter is shaken vigorously with phosphoric acid solution (10%). Finally the product is shaken with a saturated solution of sodium bicarbonate to remove any undecarboxylated keto alcohol. Finally the ethereal solution is dried, filtered and the ether removed under reduced pressure. The residue from the above is subjected to a high vacuum (1 mm.) to remove any volatile material. This product shows the properties corresponding to the formula of Compound XXI.

Reduction of Compound XXI and its Subsequent Partial Dehydration to Form Vitamin A The reduction of Compound XXI is accomplished in the manner described hereinbefore and the glycol produced is partially dehydrated by heating a toluene solution of it in the presence of small quantities of para-toluene sulfonic acid. In this case the secondary hydroxyl is the one that combines with the adjacent hydrogen to form water and a conjugated system identical with that of vitamin A. The product thus formed has all the properties of vitamin A.

Condensation of Compound XXIII with Compound I in the Presence of Zinc, etc.

Although this condensation may be effected with metals such as magnesium, aluminum, beryllium, calcium, chromium, lithium, and the like, zinc is here described as a representative example.

To 6.5 g. of freshly cleansed zinc dust is added 200 cc. of anhydrous ether, 0.05 g. iodine, 25 g. of 1-iodo-2-methyl-4-acetoxy butene-2 (Compound XXIII) and the mixture refluxed until most of the zinc is used up. Small amounts of iodine are added from time to time to activate the reaction. An ethereal solution of 24 g. of the acid chloride (Compound I) is then slowly added and the mixture refluxed for several hours longer. Finally, the mixture is poured on crushed ice mixed with ammonium sulfate. The ether layer is separated, dried and the ether removed under reduced pressure. The residue, which is subjected to high vacuum (1 mm.) to remove volatile substituents, shows the properties corresponding to the formula of Compound XXIV.

Compound XXIV is then reduced with aluminum isopropylate to the hydroxy acetate (Compound XXV) which is dehydrated as in the case of Compound VIII to the acetate of vitamin A.

Condensation of Beta-Ionylidene-Acetaldehyde, Compound XXVI, with Compound XXIII in the Presence of Zinc, etc.

As in the synthesis of Compound XXIV, the zinc dust is first reacted with 1-iodo-2-methyl-4-acetoxy butene-2 (Compound XXIII) under suitable conditions. Other metals, such as magnesium, aluminum, calcium, chromium, beryllium, lithium, etc., may also be used. The zinc organometallic compound in ether is then allowed to react with an ethereal solution of the aldehyde, Compound XXVI, by refluxing the mixture for several hours. The mixture is then poured on crushed ice containing ammonium sulfate and the resulting mixture extracted with ether from which Compound XXV is obtained. This is easily dehydrated as in the previous cases to give the acetate of vitamin A.

Condensation of Beta-Ionylidene Acetaldehyde, Compound XXVI, with Compound XXII in the Presence of Metallic Alcoholates Using again the lithium alcoholate as the representative alcoholate, the condensation is carried out as follows: About 0.7 g. of metallic lithium is dissolved in 100 cc. of absolute alcohol and the solution cooled to 0° and 27.2 g. of Compound XXII added slowly. When the vigorous reaction is over, the mixture is heated for a short time on the water bath, then cooled to room temperature and mixed with 200 cc. of anhydrous ether. The mixture is then cooled to 0° and an ethereal solution of 21.8 g. of beta-ionylidene acetaldehyde (Compound XXVI) is slowly added to it and the mixture allowed to stand at room temperature for several hours. The product is then acidified with acetic acid (25%) and the non-aqueous portion extracted with ether which is washed with a 10% solution of sodium carbonate, dried and the ether removed under reduced pressure. The residue shows the properties corresponding to Compound XXVII.

To obtain the vitamin, Compound XXVII is saponified with alcoholic potash and the mixture poured in water and acidified. The dihydroxy dicarboxylic acid obtained is then treated with anhydrous pyridine in an atmosphere of nitrogen whereby the two carboxyl groups as well as a molecule of water are lost from the molecule resulting in the production of vitamin A

I claim:

1. Process which comprises condensing a compound of the formula $$\text{(cyclohexene ring with two } CH_3 \text{ groups)}-CH=CH-C(CH_3)=CH-CHX-C(=O)-$$

in which X stands for a member of the group consisting of hydrogen and halogen with a compound of the formula $$XCH_2-C(CH_3)=CH-CH_2-O-C(=O)-R$$

in which X stands for a halogen atom and R stands for a lower alkyl group, in the presence of a metal of the group consisting of Mg, Cu, Zn, Cr, Be, Al and Li.

2. Process which comprises condensing a compound of the formula $$\text{(cyclohexene ring with two } CH_3 \text{ groups)}-CH=CH-C(CH_3)=CH-CHCl-C(=O)-$$

with a compound of the formula $$XCH_2-C(CH_3)=CH-CH_2-O-C(=O)-CH_3$$

in which X is a halogen atom in the presence of a metal of the group consisting of Mg, Ca, Zn, Cr, Be, Al, and Li.

3. Process which comprises condensing a compound of the formula $$XCH_2-C(CH_3)=CH-CH_2-O-C(=O)-CH_3$$

with a compound of the formula $$\text{(cyclohexene ring with two } CH_3 \text{ groups)}-CH=CH-C(CH_3)=CH-CH=O$$

in the presence of a metal of the group consisting of Mg, Ca, Zn, Cr, Be, Al and Li.

4. As a new product a compound of the formula $$\text{(cyclohexene ring with two } CH_3 \text{ groups)}-CH=CH-C(CH_3)=CH-CHX-C(Y)-CK(Z)(Z)$$

in which $$-C\begin{smallmatrix}X\\|\\Y\end{smallmatrix}-$$

stands for a member of the group consisting of $$-C(=O)-$$

and $$-C\begin{smallmatrix}H\\|\\OH\end{smallmatrix}-$$

Z stands for a member of the group consisting of hydrogen and carboxyalkyl groups and K stands for a member of the group consisting of —H,

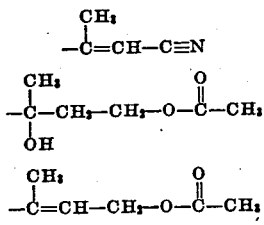

5. A compound of the formula

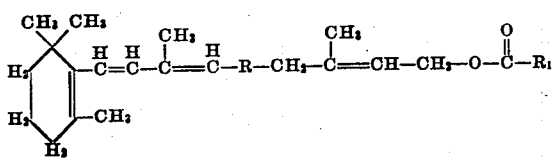

in which R represents a member of the group consisting of

and

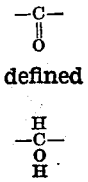

and $R_1$ is a lower alkyl group.

6. A compound as defined in claim 5 in which R is $$-\underset{O}{\overset{\|}{C}}-$$

7. A compound as defined in claim 5 in which R is $$-\underset{\underset{H}{O}}{\overset{H}{C}}-$$

NICHOLAS A. MILAS.